(12) United States Patent
Paolazzi et al.

(10) Patent No.: US 8,609,274 B2
(45) Date of Patent: Dec. 17, 2013

(54) NESTED HEATSINK HOUSING FOR LITHIUM ION CELLS

(75) Inventors: David Paolazzi, North Arlington, NJ (US); Henry Meehan, Suffern, NY (US)

(73) Assignee: Bren-Tronics Batteries International, L.L.C., Commack, NY (US)

( * ) Notice: Subject to any disclaimer, the term of this patent is extended or adjusted under 35 U.S.C. 154(b) by 897 days.

(21) Appl. No.: 12/730,642

(22) Filed: Mar. 24, 2010

(65) Prior Publication Data

US 2011/0236740 A1 Sep. 29, 2011

(51) Int. Cl.
*H01M 2/10* (2006.01)

(52) U.S. Cl.
USPC ............ 429/151; 429/120; 429/163; 29/623.1

(58) Field of Classification Search
USPC .......... 429/120, 149, 151–155, 163; 29/623.1
See application file for complete search history.

(56) References Cited

U.S. PATENT DOCUMENTS

| | | |
|---|---|---|
| 1,152,247 A | 8/1915 | Walker |
| 1,703,735 A | 2/1929 | Holland |
| 1,966,237 A | 7/1934 | Dinin |
| 3,320,095 A | 5/1967 | Bingeman et al. |
| 3,338,452 A | 8/1967 | Oakley et al. |
| 3,969,140 A | 7/1976 | White |
| 4,267,243 A | 5/1981 | Park et al. |
| 4,460,663 A | 7/1984 | Stutzbach et al. |
| 4,510,215 A | 4/1985 | Adam |
| 4,552,823 A | 11/1985 | Wozniak |
| 4,587,183 A | 5/1986 | McCartney, Jr. |
| 5,254,415 A | 10/1993 | Williams et al. |
| 5,487,958 A | 1/1996 | Tura |
| 5,663,007 A | 9/1997 | Ikoma et al. |
| 5,686,200 A | 11/1997 | Barton et al. |
| 5,695,891 A | 12/1997 | Misra et al. |
| 5,780,180 A | 7/1998 | Okamoto et al. |
| 5,817,435 A | 10/1998 | Shimakawa et al. |
| 5,864,467 A | 1/1999 | Recchia et al. |
| 6,228,528 B1 * | 5/2001 | Burkholder et al. .......... 429/163 |
| 6,296,971 B1 | 10/2001 | Hara |
| 6,300,003 B1 | 10/2001 | Misra et al. |

(Continued)

FOREIGN PATENT DOCUMENTS

| | | |
|---|---|---|
| EP | 1852924 A1 | 11/2007 |
| JP | 59091658 | 5/1984 |

(Continued)

OTHER PUBLICATIONS

Machine translation for Igarashi et al., JP 2009-277513 A.*

*Primary Examiner* — Edu E Enin-Okut
(74) *Attorney, Agent, or Firm* — Keusey & Associates, P.C.

(57) ABSTRACT

A cell housing includes a first half section having a longitudinal side having a first end and a second end. A first lateral side extends perpendicularly to the longitudinal side from the first end. The first lateral side has a first tongue. A second lateral side extends perpendicularly to the longitudinal side from the second end. The second lateral side has a first groove. A second half section is identical to the first half section. The first and second half sections are coupled to each other such that the first tongue of the first half section is inserted into the first groove of the second half section and the first tongue of the second half section is inserted into the first groove of the first half section, forming a closed perimeter.

15 Claims, 6 Drawing Sheets

(56) References Cited

U.S. PATENT DOCUMENTS

| | | |
|---|---|---|
| 6,309,776 B1 | 10/2001 | Okajima et al. |
| 6,451,475 B1 | 9/2002 | Sherwood |
| 6,653,002 B1 | 11/2003 | Parise |
| 6,733,919 B1 | 5/2004 | Nguyen et al. |
| 6,811,910 B2 | 11/2004 | Tsai et al. |
| 6,839,238 B2 | 1/2005 | Derr et al. |
| 6,953,638 B2 | 10/2005 | Inui et al. |
| 2006/0024566 A1* | 2/2006 | Plummer ............ 429/100 |
| 2006/0063067 A1 | 3/2006 | Kim |
| 2006/0115719 A1 | 6/2006 | Jeon et al. |
| 2006/0220615 A1* | 10/2006 | Kim ............ 320/116 |
| 2006/0240318 A1 | 10/2006 | Kim et al. |
| 2007/0026303 A1 | 2/2007 | Jeon et al. |
| 2007/0037051 A1* | 2/2007 | Kim et al. ............ 429/151 |
| 2007/0141459 A1 | 6/2007 | Goto et al. |
| 2008/0160395 A1 | 7/2008 | Okada et al. |
| 2009/0195210 A1 | 8/2009 | Takeuchi et al. |
| 2009/0239142 A1 | 9/2009 | Suto |
| 2009/0246616 A1* | 10/2009 | Koyama et al. ............ 429/153 |

FOREIGN PATENT DOCUMENTS

| | | | |
|---|---|---|---|
| JP | 03167884 A * | 7/1991 | ............ H01L 49/02 |
| JP | 2008181733 A * | 8/2008 | ............ H01M 2/10 |
| JP | 2009099445 | 5/2009 | |
| JP | 2009277513 A * | 11/2009 | ............ H01M 2/10 |
| KR | 1020050096288 | 10/2005 | |
| WO | 2006099602 A2 | 9/2006 | |

\* cited by examiner

NESTED HEATSINK HOUSING FOR LITHIUM ION CELLS

FIELD OF INVENTION

The present invention relates to housings that may be used to contain a battery cell therein. A plurality of the housings with their respective battery cells may be stacked together to form a battery.

BACKGROUND

Lithium ion batteries commonly employ metal heat sink and structural components as parts of a stacked battery assembly. These components are assembled from formed sheet metal components, which are inserted between individual battery cells. The battery cells and the interlayered sheet metal components are held together with metal or plastic bands. Spacing of the assembly relies on the thickness of the cells and is not well controlled, leading to inconsistencies in the manufacture of the batteries and reduced cell performance.

There exists a need to provide a more accurate mechanical spacing of heat sink surfaces.

SUMMARY

Briefly, the present invention provides an apparatus comprising a first half section including a first longitudinal side and a first lateral side extending perpendicularly from the first longitudinal side. The first lateral side has a first tongue. The first tongue has a first tongue lip extending toward the first longitudinal side. A second half section comprises a second longitudinal side and a second lateral side extending perpendicularly from the second longitudinal side. The second lateral side has a first groove. The first groove has a first groove lip extending toward the second longitudinal side. The first and second half sections are coupled to each other such that the first tongue of the first half section is inserted into the first groove of the second half section, forming a closed perimeter. A first clip is disposed over the first tongue lip of the first half section and the first groove lip of the second half section. The first clip secures the first and second half sections to each other.

Further, the present invention provides a method of manufacturing a cell comprising the steps of disposing an electrical cell between a first half section of a cell housing and a second half section of the cell housing, the second half section being identical to the first half section. The first half section comprises a longitudinal side having a first end and a second end and a first lateral side extending perpendicularly to the longitudinal side from the first end. The first lateral side has a first tongue. The first tongue has a first tongue lip extending toward the longitudinal side. A second lateral side extends perpendicularly to the longitudinal side from the second end. The second lateral side has a first groove. The first groove has a first groove lip extending toward the longitudinal side. The method further comprises the steps of engaging the first tongue of the first half section with the first groove of the second half section and the first tongue of the second half section with the first groove of the first half section; applying an even pressure along the longitudinal side of the first and second half sections; and securing the first and second half sections to each other.

Additionally, the present invention provides a cell housing comprising a first half section including a longitudinal wall having a first end and a second end and a first lateral wall extending perpendicular to the first longitudinal wall from the first end. The first lateral wall has a tongue at a free end thereof. A second lateral wall extends parallel to the first lateral wall from the second end. The second lateral wall has a groove at a free end thereof. A second half section is identical to the first half section. A tongue of the second half section is inserted into the groove of the first half section and the tongue of the first half section is inserted into a groove of the second half section. A first clip secures the first half section to the second half section at the free end of the first lateral wall. A second clip secures the first half section to the second half section at the free end of the second lateral wall.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings certain embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Figure 1:
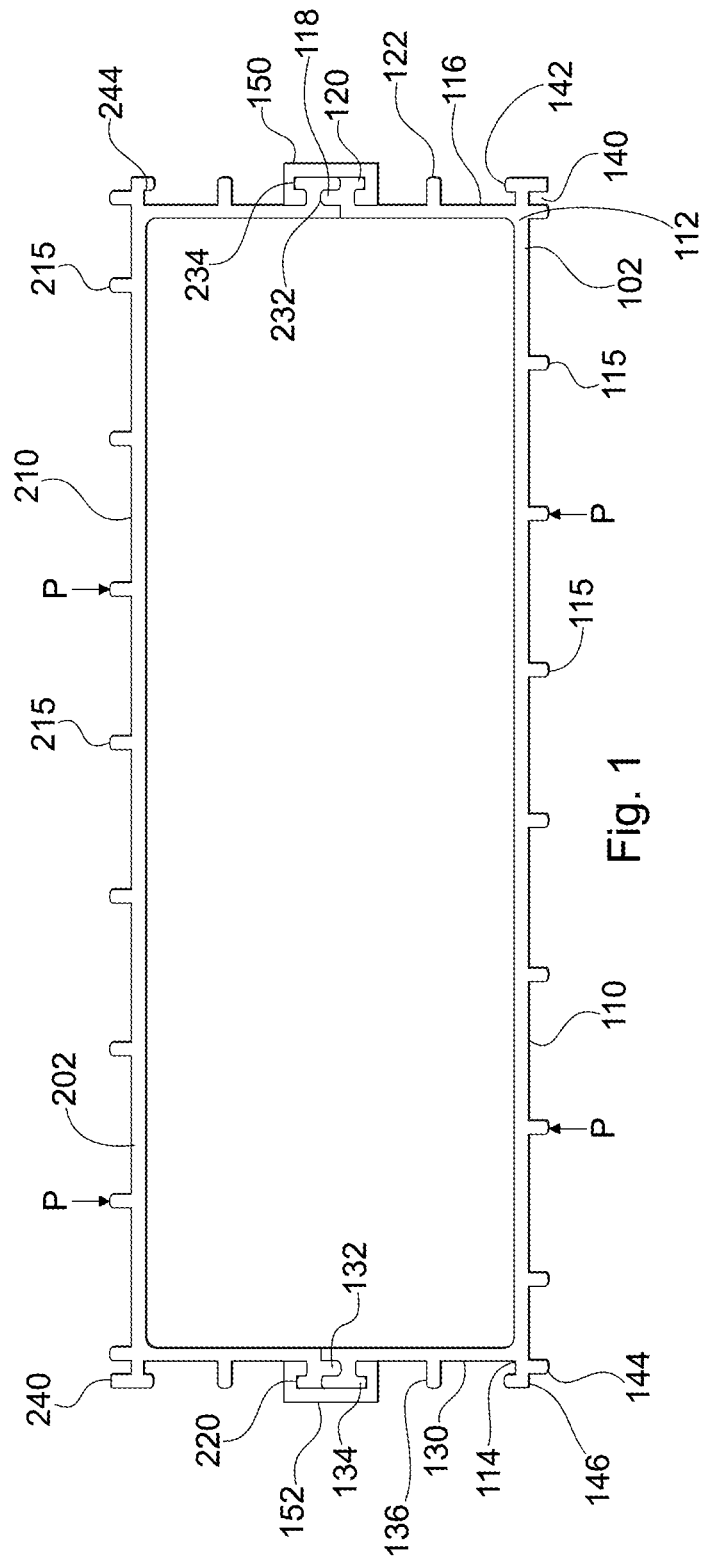
FIG. 1 is a top plan view of a cell housing according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale. In the drawings, similar reference numbers are used for designating similar elements throughout the several figures.

The following describes particular embodiments of the present invention. It should be understood, however, that the invention is not limited to the embodiments detailed herein. As used herein, the term "hermaphroditic" means a device that has both male and female portions wherein the male portion is insertable into the female portions such as, for example, a tongue-and-groove arrangement.

With reference made to the figures, an exemplary embodiment of the present invention is a cell housing 100 for a large-format Lithium-ion ("Li-ion") cell. Cell housing 100 is made of a pair of approximately squared-off "U" shaped first and second half sections 102, 202 that are interlockable with each other. In an exemplary embodiment, first and second half sections 102, 202 are identical hermaphroditic sections that are interlockable when second half section 202 is rotated by 180 degrees compared to first half section 102. A cell 101 is located within the space defined by interlocked hermaphroditic half sections 102, 202.

First and second half sections 102, 202, respectively, may be constructed from a metal extrusion, such as, for example, aluminum. For numbering purposes only, because second half section 202 is identical to first half section 102, elements 2xx of second half section 202 have the same last two digits as respective elements 1xx in first half section 102.

Figure 2:
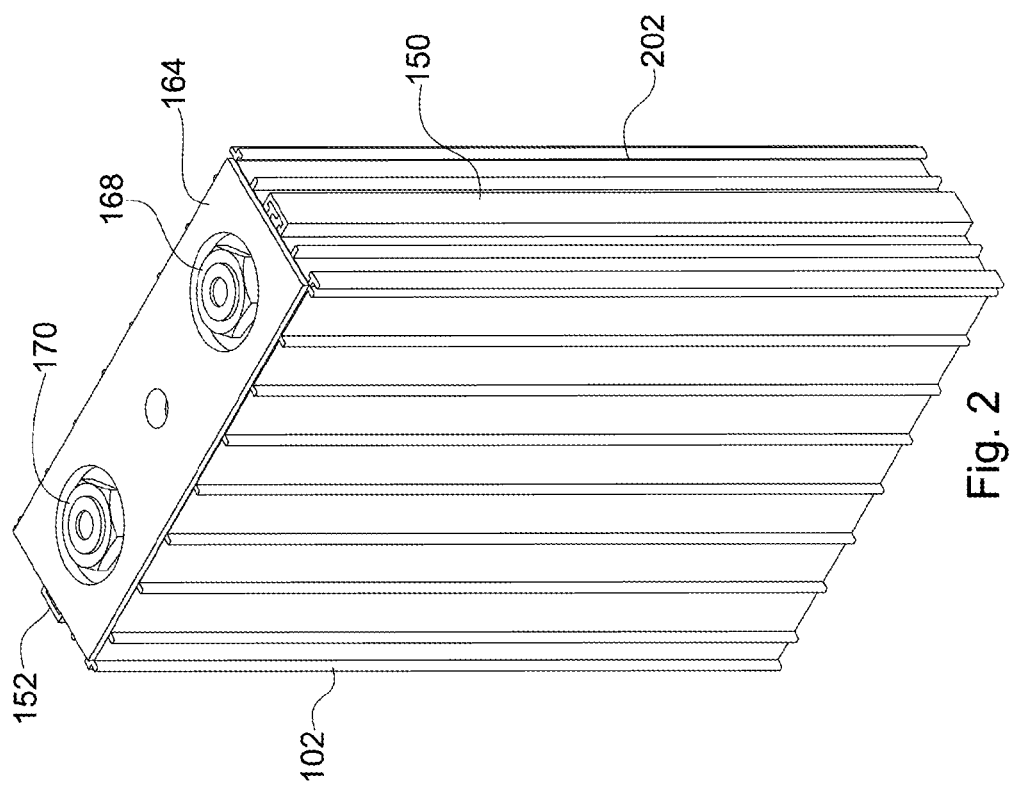
FIG. 2 is a perspective view of the cell housing of FIG. 1.
Figure 3:
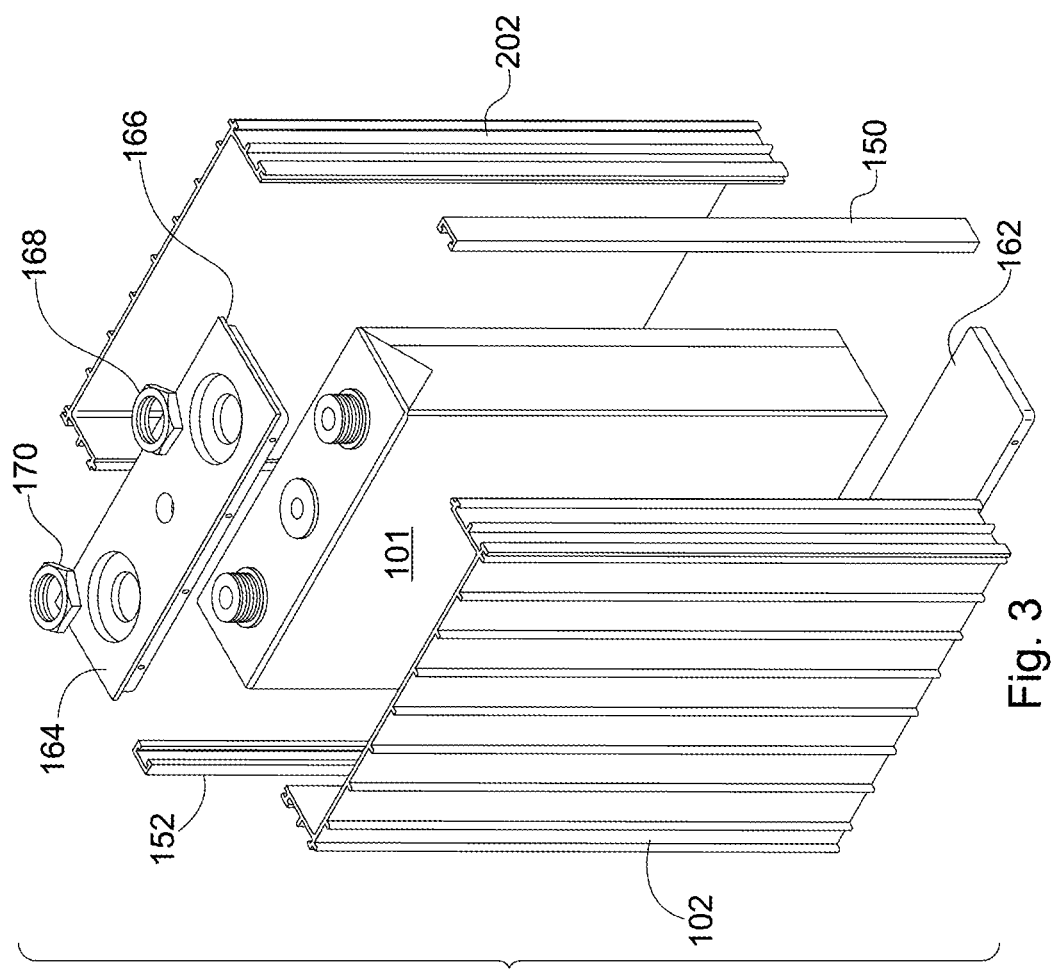
FIG. 3 is an exploded perspective view of the cell housing of FIG. 1.

Referring specifically to FIGS. 1-3, first half section 102 includes a longitudinal side 110 having a first end 112 and a second end 114. A plurality of heat dissipating fins 115 extend outwardly from longitudinal side 110. Heat dissipating fins 115 serve the purposes of dissipating heat away from cell housing 100, as well as providing spacing between adjacent cell housings 100, as will be discussed in more detail later herein.

A first lateral side 116 extends perpendicularly to longitudinal side 110 from first end 112. First lateral side 116 has a first tongue 118. First tongue 118 has a first tongue lip 120 extending toward longitudinal side 110. First lateral side 116 also has at least one heat dissipating fin 122 extending outwardly therefrom.

A second lateral side 130 extends perpendicularly to longitudinal side 110 from second end 114. Second lateral side 130 has a first groove 132. First groove has a first groove lip 134 extending toward longitudinal side 110. Second lateral side 130 also has at least one heat dissipating fin 136 extending outwardly therefrom.

First half section 102 further includes a second groove 140 extending parallel to first lateral side 116 at an intersection of longitudinal side 110 and first lateral side 116. Second groove 140 comprises a second groove lip 142. A second tongue 144 extends parallel to second lateral side 130 at an intersection of longitudinal side 110 and second lateral side 130. Second tongue 144 comprises a second tongue lip 146. In an exemplary embodiment, the length of second tongue 144 is the same length as that of heat dissipating fins 115.

First and second half sections 102, 202, respectively, may be coupled to each other such that first tongue 118 of first half section 102 is inserted into first groove 232 of second half section 202 and first tongue 218 of second half section 202 is inserted into first groove 132 of first half section 102, forming a closed perimeter.

Figure 4:
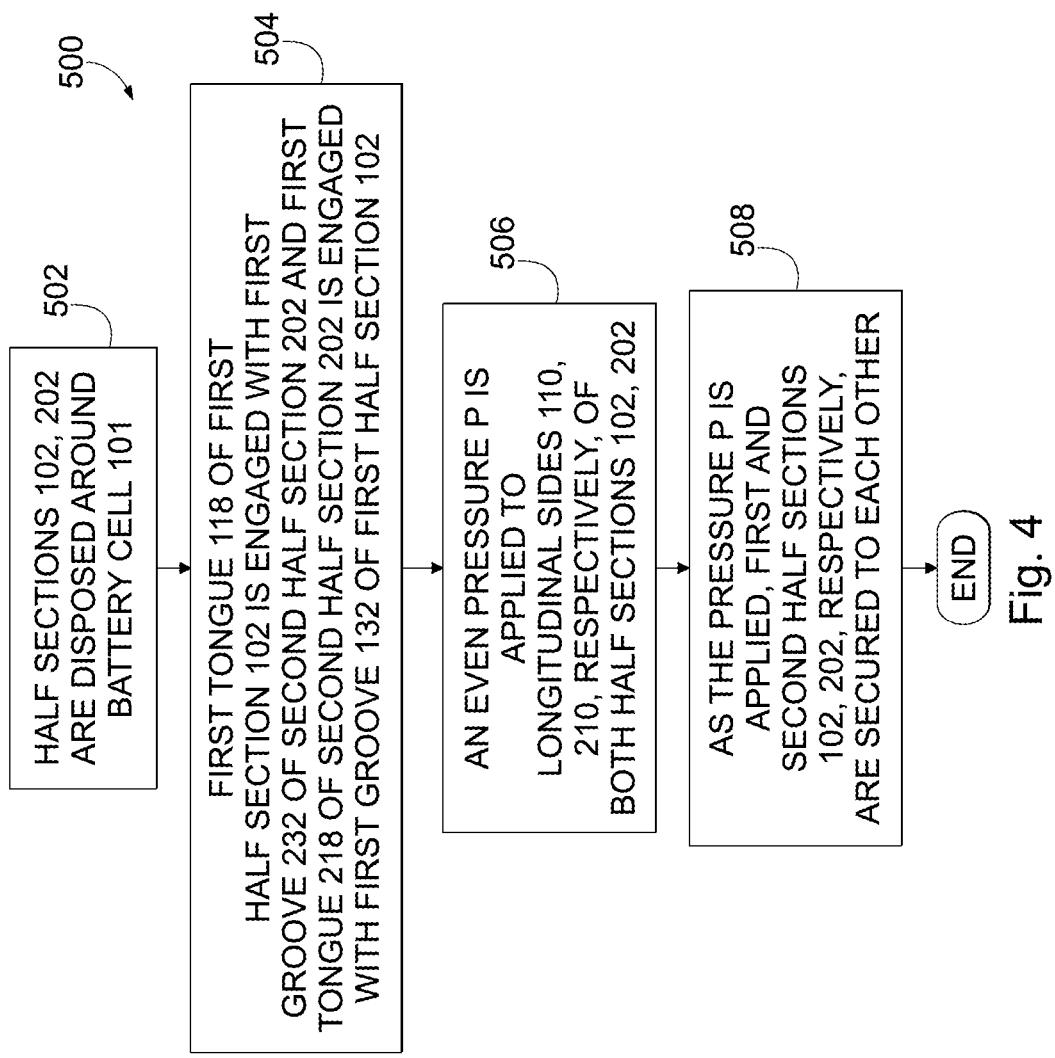
FIG. 4 is a flow chart illustrating steps performed to form a battery cell using an exemplary cell housing according to the present invention.

Referring still to FIGS. 1-3, as well as to the flow chart 500 illustrated in FIG. 4, to form a cell using cell housing 100, battery cell 101 is placed on a base 162. In step 502, half sections 102, 202 are disposed around battery cell 101 and base 162.

In step 504, first tongue 118 of first half section 102 is engaged with first groove 232 of second half section 202 and first tongue 218 of second half section 202 is engaged with first groove 132 of first half section 102.

In step 506, an even pressure P is applied to longitudinal sides 110, 210, respectively, of both half sections 102, 202 as shown in FIG. 1. This even pressure results in an even pressure being applied to battery cell 101, which provides an even contact force between adjacent electrodes and separators (not shown) that make up battery cell 101. This even contact force provides for an even distribution of the current generated by battery cell 101, resulting improved performance and longer life of battery cell 101 compared to prior art battery cells.

In step 508, as the pressure P is applied, first and second half sections 102, 202, respectively, are secured to each other. In an exemplary embodiment of the presenting invention, to secure first and second half sections 102, 202 to each other, a first clip 150 may be disposed over first tongue lip 120 of first half section 102 and first groove lip 234 of second half section 202 such that first clip 150 couples first and second half sections 102, 202, respectively, to each other. First clip 150 may be a generally "C-shaped" clip that is symmetric about a centerline, so that first clip 150 may couple first and second half sections 102, 202, respectively, to each other in one of two orientations.

A second clip 152, identical to first clip 150, may similarly be disposed over a first tongue lip 220 of second half section 202 and first groove lip 134 of first half section 102 such that second clip 152 couples first and second half sections 102, 202, respectively, to each other.

After battery cell 101 and base 162 are secured within first and second half sections 102, 202, a battery cell lid 164 is placed over battery cell 101. A lip 166 of lid 164 extends over longitudinal sides 110, 210 and lateral sides 116, 130, 216, 230. Lid 164 is secured to battery cell 101 by nuts 168, 170. Lid 164 prevents clips 150, 152 from being slid upward and off cell housing 100.

Figure 5:
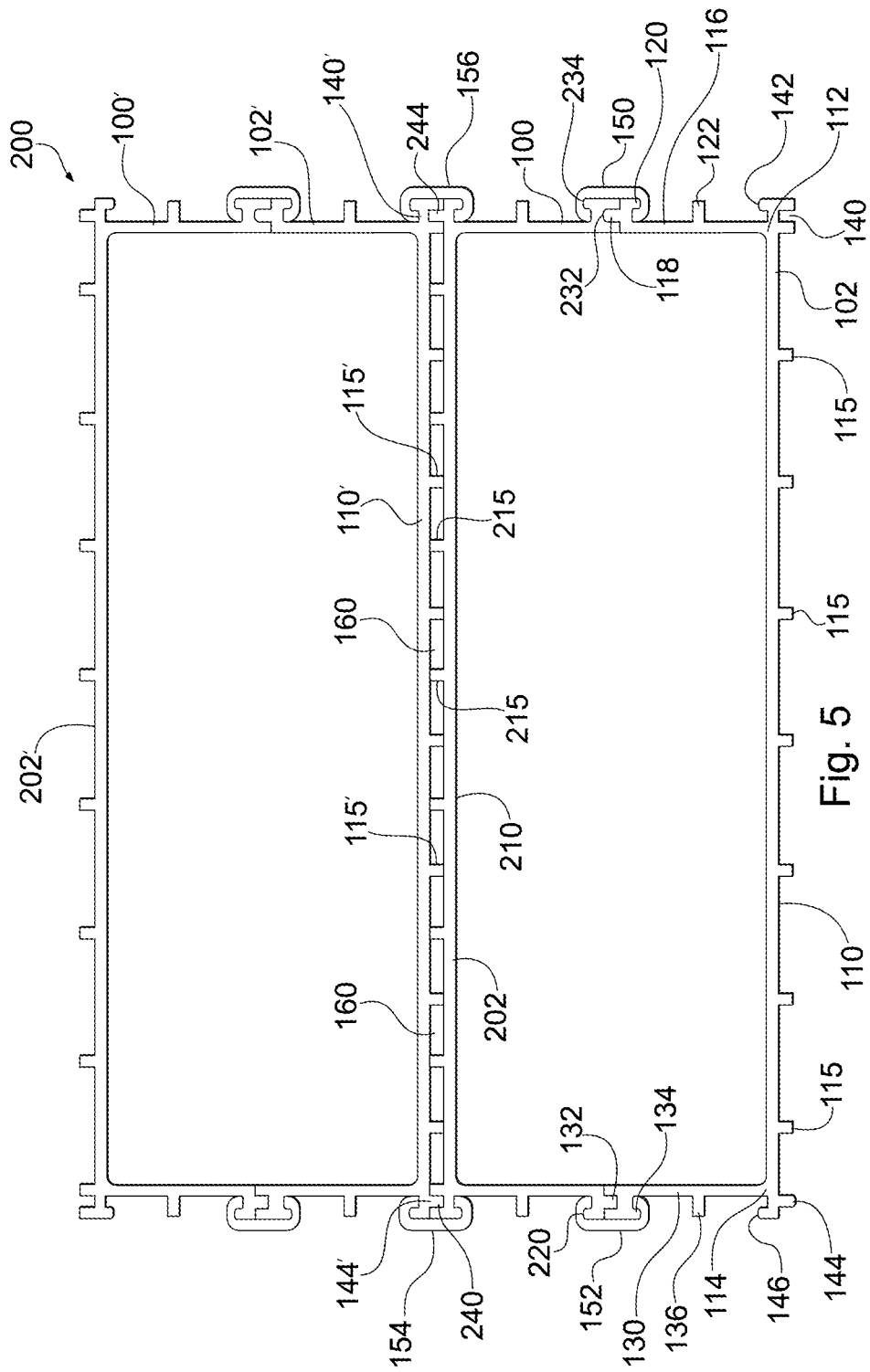
FIG. 5 is a top plan view of a plurality of cell housings of FIG. 1 coupled together.
Figure 6:
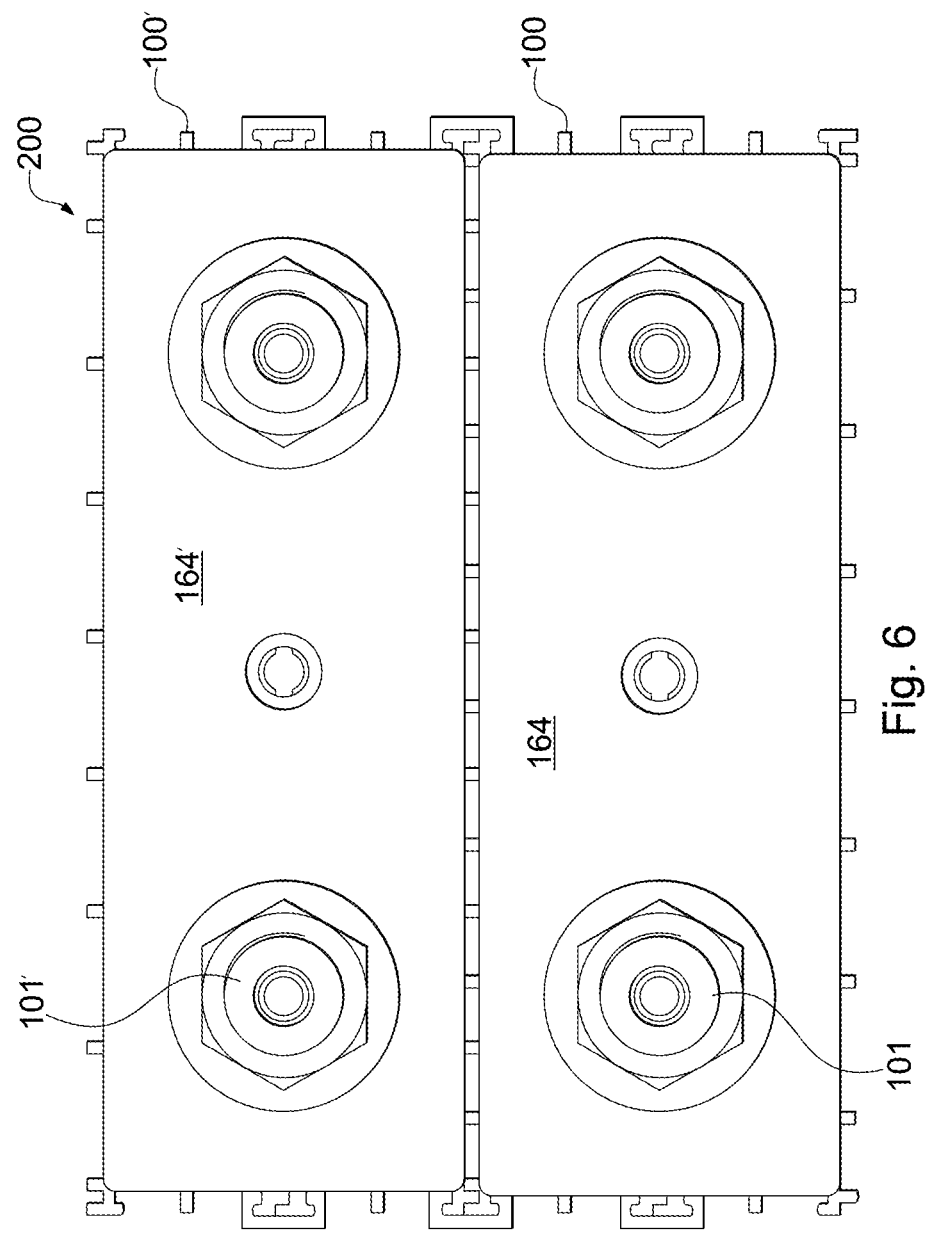
FIG. 6 is a top plan view of a battery cell located in each of the plurality of cell housings of FIG. 5.

Referring now to FIGS. 5 and 6, a plurality of cell housings 100, 100' may be coupled together to form a multi-cell battery 200. For numbering purposes only, because a second cell housing 100' is identical to cell housing 100, elements 1xx' and 2xx' of cell housing 100' have the same digits as respective elements 1xx and 2xx in first cell housing 100, but with a "'" ("prime") at the end of the element in cell housing 100'. For example, first half section 102 is identical to a third half section 102' and second half section 202 is identical to a fourth half section 202', with third and fourth half sections 102' and 202' making up second cell housing 100'.

A tongue 144' of second cell housing 100' is inserted into a groove 240 of cell housing 100 and tongue 244 of cell housing 100 is inserted into a groove 140' of second cell housing 100' to couple cell housing 100 to cell housing 100', forming multi-cell battery 200.

Third and fourth clips 154, 156, respectively, may be used to couple cell housings 100, 100' to each other. Third clip 154 slides over the tongue and groove connections of tongue 144' and groove 240, while fourth clip 156 slides over the tongue and groove connections of tongue 244 and groove 140'.

Several of the heat dissipating fins 215 of cell housing 100 engage the longitudinal side 110' of second cell housing 100' and several of the heat dissipating fins 115' of second cell housing 100' engage the longitudinal side 210 of first cell housing 100 such that a plurality of voids 160 are formed between cell housing 100 and second cell housing 100'. These voids allow for air flow between cell housing 100 and second cell housing 100' and help to dissipate heat generated within cell housing 100 and second cell housing 100' by their respective battery cells 101, 201.

While only two cell housings 100, 100' are shown being coupled to each other, those skilled in the art will recognize that additional cell housings may be similarly coupled to cell housings 100, 100' as desired.

While the principles of the invention have been described above in connection with preferred embodiments, it is to be clearly understood that this description is made only by way of example and not as a limitation of the scope of the invention.

What is claimed is:

1. An apparatus comprising:
   a first half section comprising:
      a first longitudinal side having heat dissipating fins;
      a first lateral side extending perpendicularly from the first longitudinal side, the first lateral side having a first tongue, the first tongue having a first tongue lip extending toward the first longitudinal side;
      a second lateral side having a second tongue extending parallel to the second lateral side at an intersection of said first longitudinal side and said second lateral side, wherein the length of said second tongue is the same as said heat dissipating fins;
a second half section comprising:
a second longitudinal side;
a second lateral side extending perpendicularly from the second longitudinal side, the second lateral side having a first groove, the first groove having a first groove lip extending toward the second longitudinal side;
the first and second half sections being identical and coupled to each other such that the first tongue of the first half section is inserted into the first groove of the second half section, forming a closed perimeter cell housing; and
a first clip disposed over the first tongue lip of the first half section and the first groove lip of the second half section, the first clip securing the first and second half sections to each other, wherein said second tongue is configured for coupling to a further cell housing with said heat dissipating fins engaging a longitudinal side of the further cell housing.

2. The apparatus according to claim 1, wherein said second lateral side extends perpendicularly to the first longitudinal side, the second lateral side having a second groove, the second groove having a second groove lip extending toward the first longitudinal side.

3. The apparatus according to claim 2, further comprising a cell disposed within the apparatus.

4. The apparatus according to claim 2, wherein the second half section further comprises a third groove extending parallel to the second lateral side at an intersection of the second longitudinal side and the second lateral side.

5. The apparatus according to claim 4, wherein the apparatus further comprises:
a third half section, identical to the first half section; and
a fourth half section, identical to the second half section, wherein the second tongue of the third half section is inserted into the third groove of the second half section;
a first cell disposed within the first and second half sections;
a second cell disposed within the third and fourth half sections; and
a second clip disposed over the second tongue of the first half section and the third groove fourth half section, the second clip coupling the first half section and the fourth half section to each other.

6. The apparatus according to claim 5, wherein the second longitudinal side of the second half section and the first longitudinal side of the third half section each comprises a plurality of heat dissipating fins extending outwardly therefrom, such that the plurality of heat dissipating fins of the second half section engage the first longitudinal side of the third half section and the plurality of heat dissipating fins of the third half section engage the second longitudinal side of the third half section and form a plurality of voids between the second half section and the third half section.

7. A method of manufacturing a cell comprising the steps of:
a) disposing an electrical cell between an extruded first half section of a cell housing and an extruded second half section of the cell housing, the second half section being identical to the first half section, the first half section comprising:
a longitudinal side having, heat dissipating fins, a first end and a second end;
a first lateral side extending perpendicularly to the longitudinal side from the first end, the first lateral side having a first tongue, the first tongue having a first tongue lip extending toward the longitudinal side; and
a second lateral side extending perpendicularly to the longitudinal side from the second end, the second lateral side having a first groove, the first groove having a first groove lip extending toward the longitudinal side, said second lateral side having a second tongue extending parallel to the second lateral side at an intersection of said longitudinal side and said second lateral side, wherein the length of said second tongue is the same as said heat dissipating fins;
b) engaging the first tongue of the first half section with the first groove of the second half section and the first tongue of the second half section with the first groove of the first half section;
c) applying an even pressure along the longitudinal side of the first and second half sections; and
d) securing the first and second half sections to each other to form a closed perimeter cell housing, wherein said second tongue is configured for coupling to a further cell housing with said heat dissipating fins engaging a longitudinal side of the further cell housing.

8. The method according to claim 7, wherein step d) comprises the step of securing the first and second half sections to each other where the first tongue of the first half section engages with the first groove of the second half section.

9. The method according to claim 8, wherein step d) further comprises using a clip to secure the first and second half sections to each other.

10. A cell housing comprising:
a first half section comprising:
a longitudinal wall having, heat dissipating fins, a first end and a second end;
a first lateral wall extending perpendicular to the first longitudinal wall from the first end, the first lateral wall having a first tongue at a free end thereof; and
a second lateral wall extending parallel to the first lateral wall from the second end, the second lateral wall having a groove at a free end thereof, wherein said second lateral wall having a second tongue extending parallel to the second lateral wall at an intersection of said longitudinal wall and said second lateral wall, wherein the length of said second tongue is the same as said heat dissipating fins;
a second half section, identical to the first half section, wherein a tongue of the second half section is inserted into the groove of the first half section and the first tongue of the first half section is inserted into a groove of the second half section;
a first clip securing the first half section to the second half section at the free end of the first lateral wall; and a second clip securing the first half section to the second half section at the free end of the second lateral wall to form a closed perimeter cell housing, wherein said second tongue is configured for coupling to a further cell housing with said heat dissipating fins engaging a longitudinal side of the further cell housing.

11. The cell housing according to claim 10, wherein the heat dissipating fins extending outwardly from the wall between the first and second ends.

12. The cell housing according to claim 10, wherein each of the first and second lateral walls further comprises at least one heat dissipating fin extending outwardly from the respective wall.

13. The cell housing according to claim 10, wherein the first end of the longitudinal wall further comprises a tongue extending therefrom.

14. The cell housing according to claim 13, wherein the longitudinal wall further comprises a plurality of heat dissipating fins extending outwardly from the wall between the first and second ends such that each of the plurality of heat dissipating fins has a length equal to a length of the tongue extending from the longitudinal wall.

15. The cell housing according to claim 10, wherein the second end of the longitudinal wall further comprises a groove formed therein.

\* \* \* \* \*